US005390411A

United States Patent [19]

Vogt et al.

[11] Patent Number: 5,390,411

[45] Date of Patent: Feb. 21, 1995

[54] METHOD FOR THE MANUFACTURE OF A FUEL INJECTION VALVE

[75] Inventors: Dieter Vogt, Korntal-Muenchingen; Ferdinand Reiter, Markgroeningen; Martin Maier, Moeglingen, all of Germany

[73] Assignee: Robert Bosch GmbH, Stuttgart, Germany

[21] Appl. No.: 100,945

[22] Filed: Aug. 3, 1993

Related U.S. Application Data

[62] Division of Ser. No. 849,066, Apr. 22, 1992, Pat. No. 5,263,648.

[30] Foreign Application Priority Data

Aug. 24, 1990 [DE] Germany ............................ 4026721

[51] Int. Cl.[6] ............................................ B23P 15/00

[52] U.S. Cl. ......................... 29/890.131; 29/890.129; 29/407

[58] Field of Search .................... 29/890.131, 890.129, 29/407; 239/585.1, 585.4, 533.2, 533.4; 251/359, 129.18

[56] References Cited

U.S. PATENT DOCUMENTS

| | | | |
|---|---|---|---|
| 3,418,708 | 12/1968 | Siver | 29/890.129 |
| 4,699,323 | 10/1987 | Rush et al. | 239/585.1 |
| 5,178,362 | 1/1993 | Vogt et al. | 29/890.129 |

FOREIGN PATENT DOCUMENTS

| | | | |
|---|---|---|---|
| 0117603 | 9/1984 | European Pat. Off. | 239/585.4 |
| 3841142 | 6/1990 | Germany . | |

*Primary Examiner*—Irene Cuda
*Attorney, Agent, or Firm*—Edwin E. Greigg; Ronald E. Greigg

[57] ABSTRACT

A method in which a valve part consisting of a valve seat body and a support body with injection holes is pushed into a longitudinal orifice of a housing and firmly connected to a wall of the housing with the insertion depth determining the presetting of a valve needle lift. The precise setting of the valve needle life is made on a fully assembled valve by deforming the valve part between fixing areas of the support body. The method of manufacture of the injection valve is particularly suitable for fuel injection units of mixture compressing engines with externally supplied ignition.

4 Claims, 1 Drawing Sheet

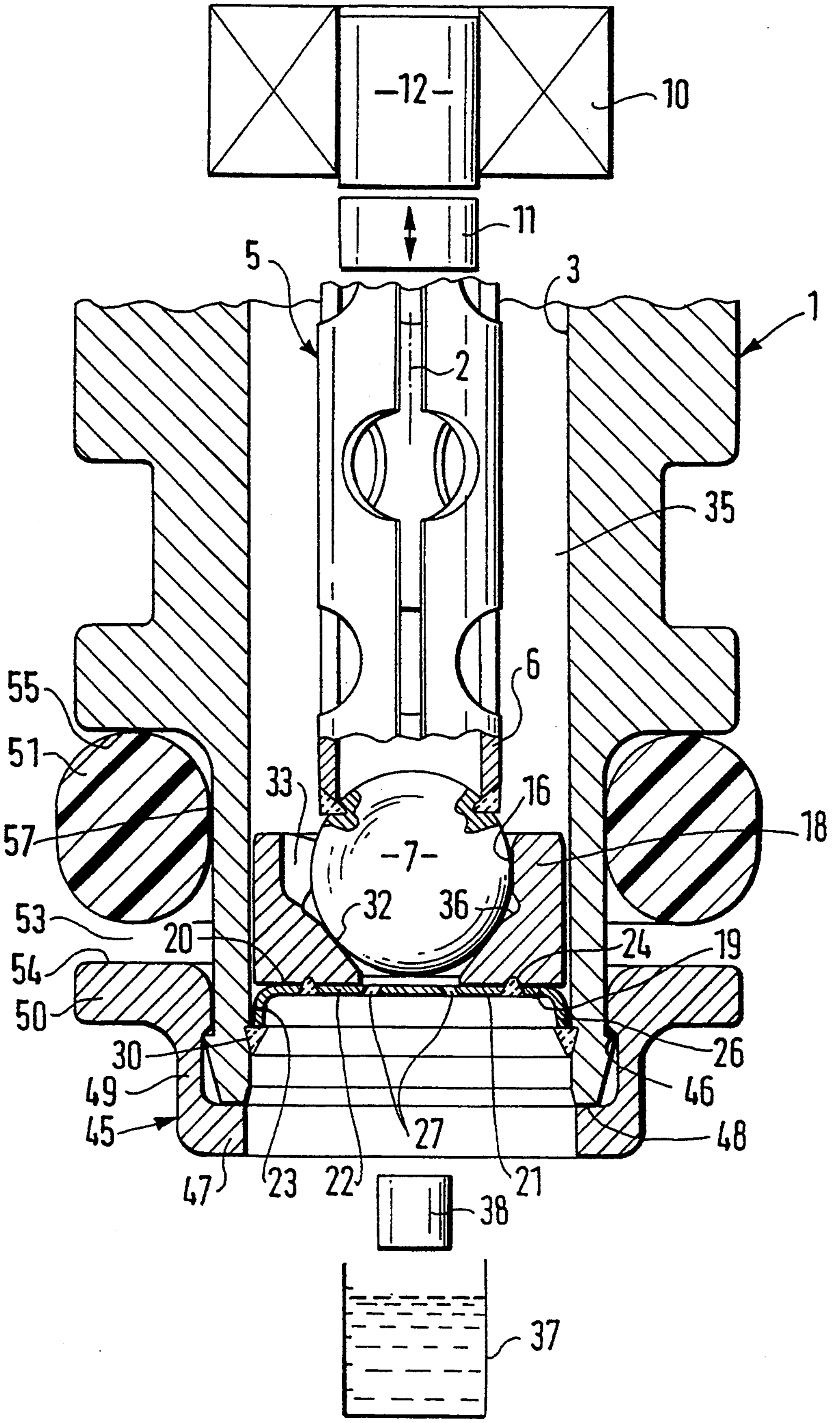
12
10
11
5
3
1
2
35
6
55
51
33
16
18
57
7
32
36
53
20
24
19
54
50
30
26
49
27
46
45
48
47
23
22
21
38
37

METHOD FOR THE MANUFACTURE OF A FUEL INJECTION VALVE

This is a divisional of application(s) Ser. No. 07/849,066, filed on Apr. 22, 1922, now U.S. Pat. No. 5,263,648.

STATE OF TECHNOLOGY

The invention is based on a method for the manufacture of an injection valve. An injection valve is already known from DE 37 10 467 A1, which has a pot-shaped body with holes upstream of its valve seat area. The body with holes is firmly clamped between the jet body and a processing sleeve. To set the valve needle lift, and hence the static flow volume of a medium discharged during the stationary opening condition of the injection valve, the front face of the jet body, against which the stop plate which determines the residual airgap of the armature opposite the core, rests, has to be ground. However, the method of manufacture has the disadvantage that the front face of the jet body can be ground only when the valve is partly dismantled, making the accurate setting of the valve needle lift very laborious.

DE 38 41 142 A1 shows an injection valve with a pot-shaped body with holes, the retaining edge of which extends in an axial direction, facing away from the valve seat area and being connected with the wall of the locating bore of the valve seat body. The valve seat body is pushed into the longitudinal orifice of the seat support and is firmly connected with it, with the valve seat body's depth of insertion into the longitudinal orifice of the seat support determining the valve needle lift. With this valve it is again impossible, in its fully assembled condition, to set the valve needle lift without having to at least partly dismantle the valve.

An injection valve with a valve seat body, having at least one ejection orifice, is described in DE 38 31 196 A1. The valve seat body is pressed into the longitudinal orifice of the seat support, with the depth of pressing determining the valve needle lift. Although the valve needle lift can be set on the fully assembled injection valve, the press-in method of locating the valve seat body in the seat support presents the risk of chipping the valve seat body and/or the seat support.

ADVANTAGES OF THE INVENTION

The injection valve in accordance with the invention and the method for the manufacture of an injection valve have the advantage of a particularly simple and economical, fully automated and accurate, setting of the valve needle lift and hence of the static flow volume of a medium discharged during the stationary opening condition, by virtue of the deformation in the axial direction, in the area between the fixing areas of the body with holes, of the valve seat part which consists of the valve seat body and the body with holes. A simple design of the injection valve results, moreover, with a simple and economical manufacture of the valve seat body and the body with holes. It is ensured that the axial extension of the body with holes is not changed in the area of the holes due to mounting the injection valve, and that the desired, specified injection characteristic, is obtained.

It is advantageous, if one retaining edge of the pot-shaped body with holes extends in an axial direction, facing away from the valve seat body, and if that retaining edge, with its free end, is firmly connected with the wall of the longitudinal orifice of the valve seat support. This ensures, on the one hand, a firm and secure hold of the valve part which consists of the valve seat body and the body with holes, in the longitudinal orifice of the seat support, and on the other hand, the body with holes can be deformed in a simple manner in an axial direction in the area between the fixing positions, in order to effect an accurate setting of the valve needle lift.

It is of particular advantage, if the retaining edge of the body with holes is bent outwards towards its free end, whereby its end diameter will be larger than the diameter of the seat support's longitudinal orifice, so that the retaining edge, on insertion of the valve part into the longitudinal orifice of the seat support, will have a radial spring action and will rest on the wall of the longitudinal orifice with light pressure, without there being any risk of chipping the body with holes and/or the longitudinal orifice of the seat support.

It is of advantage in this arrangement, if the circumference of the valve seat body has a smaller diameter than the diameter of the seat support's longitudinal orifice. Chipping of the valve seat body and/or the longitudinal orifice of the seat support during insertion of the valve seat part, which consists of the valve seat-body and the body with holes, into the seat support, will then be avoided. Moreover, the observance of a close dimensional tolerance of the circumference of the valve seat body during the manufacture is not required, so that the costs of manufacturing the valve seat body will be substantially reduced.

In order to avoid the possibility of the medium flowing between the circumference of the valve seat body and the longitudinal orifice of the seat support, to at least one injection orifice and/or between the retaining edge of the body with holes and the longitudinal orifice of the seat support, to a suction pipe of the internal combustion engine, it is of advantage if the body with holes is connected on its front face, with the front face of the valve seat body by means of a first all-round welding seam, and on its circumference, with the wall of the longitudinal orifice of the seat support by means of a second all-round welding seam.

It is of particular advantage, if the first welded seam and the second welded seam are performed by laser welding, to ensure a simple, reliable and secure weld. This method involves only slight heating of the parts during welding.

BRIEF DESCRIPTION F THE DRAWING

An embodiment example of the invention is shown in a simplified view in the drawing, FIG 1, and is described in more detail in the following description. The illustration shows a partly presented injection valve in accordance with the embodiment example.

DETAILED DESCRIPTION

As an example, the illustration shows a part sectional view a fuel injection valve for fuel, injection units of mixture compressing engines with externally supplied ignition. The fuel injection valve has a tube-shaped seat support 1, in which a longitudinal orifice 3 is configured, concentric in relation to the valve's longitudinal axis 2. In the longitudinal orifice 3, a tube-shaped valve needle 5 is arranged which, at its downstream end 6, is connected to a ball-shaped valve closing body 7. The operation of the fuel injection valve takes place in a known manner, for example, electromagnetically. The axial movement of the valve needle 5 and hence the opening and closing of the fuel injection valve, is facilitated by an indicated electromagnetic circuit with a magnet coil 10, an armature 11, and a core 12. The armature 11 is connected to the end of the valve needle 5 which faces away from the valve closing body 7, and is aligned towards the core.

The guidance of the valve closing body 7 during the axial movement is facilitated by a guide orifice 16 of a valve seat body 18. The circumference of the valve seat body 18 has a smaller diameter than the diameter of the longitudinal orifice 3 of the seat support 1. On its front face 19 which faces away from the valve closing body 7, the valve seat body 18 is concentrically and firmly connected with a bottom part 21 of a body with holes 22, such that the bottom part 21 rests with its front face 20 against the front face 19 of the valve seat body 18. The connection of the valve seat body 18 and the body with holes 22 is, for example, by means of an all-round sealing first welding seam 24, which, for example, is formed by means of a laser. For this reason, good weldability of the material for the body with holes 22 must be taken into account. This type of assembly avoids the risk of deformation of the bottom part 21 in the area of at least one, or two, as in the example, injection orifices 27, which is/are formed by spark erosion.

The body with holes 22 has a pot-shaped cross-sectional form. Next to the bottom part 21 of the body with holes 22 is an all-round retaining edge 23 which extends in an axial direction away from the valve seat body 18 and is conically bent outwards towards one end 26. In this arrangement, the retaining edge 23 has at its end 26 a larger diameter than the diameter of the longitudinal orifice 3 of the seat support 1.

With the valve needle 5 inserted into the longitudinal orifice 3 of the seat support 1, the valve seat part, which consists of the valve seat body 18 and the body with holes 22, is pushed into the longitudinal orifice 3. Due to the diameter of the valve seat body's 18 circumference being smaller in comparison tò the longitudinal orifice 3 of the seat support 1, radial pressing exists only between the longitudinal orifice 3 and the retaining edge 23, which is bent slightly conically outwards, of the body part 21 with holes 22, with the retaining edge 23 effecting a radial spring action to the wall of the longitudinal orifice 3. In this way, chipping is avoided both on the valve seat part and on the longitudinal orifice 3 during insertion of the valve seat part, which consists of the valve seat body 18 and the body with holes 22, into the longitudinal orifice 3 of the seat support 1. During the manufacture of the valve seat body 18, moreover, the observance of a close dimensional tolerance on its circumference is not necessary since the valve seat body 18 has slight clearance in radial direction in the longitudinal orifice 3 of the seat support 1, so that the manufacturing costs are substantially reduced by comparison with a valve seat body which is pressed into the longitudinal orifice 3. The insertion depth of the valve seat part into the longitudinal orifice 3 of the seat support 1 determines the presetting of the lift of the valve needle 5, since the one end position of the valve needle 5, in the case of a non-excited magnet coil 10, is fixed by virtue of the fact that the valve closing body 7 rests against a valve seat face 32 of the valve seat body 18. The other end position of the Valve needle 5 is fixed, with the magnet coil 10 being excited, by, for example, the armature 11 resting against the core 12. The distance between theses two end positions of the valve needle 5 represents the lift.

At its one end 26, which rests against the longitudinal orifice 3 of the seat support 1, the retaining edge 23 0f the body with holes 22 is connected with the wall of the longitudinal orifice 3 by, for example, an all-round and sealed second welded seam 30. The second welding seam 30 is formed exactly like the first welding seam 24, for example, by means of a laser, resulting in a secure and reliable weld which is made in a simple manner and in which the heating of the parts being welded together is low.

Sealed welding of the valve seat body 18 and the body with holes 22, and of the body with holes and the seat support 1 is necessary, so that the medium being used, a fuel for example, cannot flow between the longitudinal orifice 3 of the seat support 1 and the circumference of the valve seat body 18, through to the injection orifices 27, or between the longitudinal orifice 3 of the seat support 1 and the retaining edge 23 of the body with holes 22, directly into a suction line of the internal combustion engine.

The body with holes 22 thus has two fixing areas, one fixing area being the first welding Seam 24 with the valve seat body 18, and the second fixing area being the second welding seam 30 with the seat support 1.

The spherical valve closing body 7 acts in conjunction with the valve seat area 32, which tapers in the direction of flow, of the valve seat body 18; this valve seat area is configured in the axial direction between the guide orifice 16 and the front face 19 of the valve seat body 18. As shown in the illustration to the left of the valve's longitudinal axis 2, the guide orifice has at least one flow passage 33, which facilitates the flow of a medium from the valve interior 35, which is limited in radial direction by the longitudinal orifice 3 of the seat support 1, to an annular groove 36 which is arranged in a flow direction between the guide orifice 16 and the valve seat area 32 of the valve seat body 18, which in the open condition of the valve is linked with the injection orifices 27 of the plate with holes 22. For precise guidance of the valve closing body 7, and hence of the valve needle 5 during the axial movement, the diameter- of the guide orifice 16 is designed so that the spherical valve closing body 7 projects through the guide orifice 16 with a small radial separation.

The accurate setting of the lift of the valve needle 5, and hence of the static flow volume of the medium being discharged during the stationary open condition of the valve, is made on the fully assembled injection valve, this means inter alia, that the body with holes 22, which is welded together with the valve seat body 18, is welded with its retaining edge 23, to the seat support 1. Should the static actual volume of the medium, which is discharged by the, valve and measured by means of a metering vessel 37, not agree with the required, specified target volume, then the body with holes 22, in order to effect accurate setting of the lift of the valve needle 5, is stretched in axial direction in the area between the second welding seam 30 and the first welding seam 24 by means of a tool 38 and thereby subjected to plastic deformation until the measured actual volume of medium agrees with the specified target volume.

The injection valve in accordance with the invention, and the method in accordance with the invention for tile manufacture of an injection valve will, in a simple manner, permit the accurate setting of the static flow volume of a medium which is discharged during the stationary open condition of the injection valve, on the fully assembled injection valve.

On the circumference of the seat support 1, a protective cap 45 is arranged on its downstream end, which faces away from the magnet coil 10, and is connected with the circumference of the seat support 1 by means of a snap-type connection 46. With a first front face radial section 47, the protective cap 45 rests against a front face 48 of the seat support 1. Adjoining the first radial section 47 of the protective cap 45 in the direction facing the magnet coil 10 are: firstly, an axially extending parallel section 49, and adjoining this, a second radial section 50 which points radially outward. A sealing ring 51 is arranged within an annular groove 53, the side faces of which are formed by a front face 54, which faces the magnet coil 10, of the second radial section 50 of the protective cap 45, and by a radially outward pointing contact area 55 of the seat support 1 and its groove valley 57, by the circumference of the seat support 1. The sealing ring 51 is used to effect a seal between the circumference of the fuel injection valve and a valve location, not shown, for example the suction line of the internal combustion engine.

The foregoing relates to a preferred exemplary embodiment of the invention, it being understood that other variants and embodiments thereof are possible within the spirit and scope of the invention, the latter being defined by the appended claims.

We claim:

1. A method for the manufacture of an injection valve for fuel injection units of internal combustion engines, with a tubular housing, which has a longitudinal orifice extending concentrically in relation to a longitudinal axis, a valve seat body which has a valve seat area and an axial passage, a movable valve needle inserted in said longitudinal orifice which acts in conjunction with the valve seat area, a support body which has at least one injection orifice, a bottom part of said support body resting against the valve seat body, including a cylindrical and retaining edge, the method comprising forming the bottom part (21) of the support body with a bent retaining edge (23) with a free end (26) that has a diameter greater than a diameter of the longitudinal orifice (3) of the tubular housing, securing the bottom part (21) of the support body to an adjacent surface of said valve seat body by means of a first welding seam (24), in which arrangement the bent retaining edge (23) of said support body is facing outward away from the valve seat body (18); in a second process step, pushing the valve seat body and the support body together into the longitudinal orifice (3) of the housing with the retaining edge facing outward in order to effect a presetting of a lift of the valve needle (5); in a third process step, connecting the free end (26) of the retaining edge of the support body firmly to a wall of the longitudinal orifice (3) of the housing by means of a second welding seam (30); in a fourth process step, measuring a static actual medium volume, which is discharged during a stationary open condition of the injection valve and comparing the static actual medium volume measured with a desired, specified target volume of the medium, and in a fifth process step, deforming the support body in an axial direction, in an area between the first welding seam (24) and the second welding seam (30) for a precise setting of the valve needle lift, until the measured static actual volume of the medium agrees with the specified target volume of the medium.

2. A process in accordance with claim 1, including forming the first welding seam (24) and the second welding seam (30) completely around a circular form for a tight sealing.

3. A process in accordance with claim 1, including forming the first welding seam (24) and the second welding seam (30) by laser welding.

4. A process in accordance with claim 2, including forming the first welding seam (24) and the second welding seam (30) by laser welding.

* * * * *